Dec. 31, 1968  H. B. CLAFLIN  3,418,695
PAPERBOARD FORM CONSTRUCTION FOR RUBBER MOLD
Filed Sept. 30, 1966  Sheet 1 of 2

INVENTOR.
Howard B. Claflin
BY
Frease & Bishop
ATTORNEYS

INVENTOR.
Howard B. Claflin
BY
Frease & Bishop
ATTORNEYS

United States Patent Office 3,418,695
Patented Dec. 31, 1968

3,418,695
PAPERBOARD FORM CONSTRUCTION FOR RUBBER MOLD
Howard B. Claflin, 1951 Tudor St.,
Cuyahoga Falls, Ohio 44221
Filed Sept. 30, 1966, Ser. No. 583,250
12 Claims. (Cl. 18—45)

The invention relates to paperboard forms, and more particularly to the construction and structure of a simplified paperboard mold which is destructible and which may be used in the manufacture of molded rubber fuel tanks, fuel cells and other similar articles or containers.

Heretofore, destructible rubber fuel cell molds, upon which hollow rubber articles may be made and the molds thereafter destroyed and removed from the interior of the molded rubber containers, have been fabricated in several different manners. One usual and preferred mold structure is substantially entirely made of corrugated paperboard of various weights, plies, strengths, thicknesses, etc. In such structures, all outer mold surfaces are formed by corrugated paperboard sheet members; and such structures are not objectionable where all outer mold surfaces are plane surfaces.

However, such prior corrugated paperboard mold structures are not satisfactory where curved mold surfaces are required, since the bending of flat corrugated paperboard to form a curved surface is difficult, the corrugated paperboard is weakened, and the outer resultant curved paperboard mold surface may be wrinkled or uneven and not smooth.

On the other hand, it is desired that the hollow rubber article to be made on such mold have as smooth an interior surface as possible, and therefore the paperboard form should have a completely smooth outer surface.

Accordingly, objectives of the invention are to provide a new paperboard mold structure which may be formed throughout of corrugated paperboard and kraft paper, with flat paperboard and convexly or concavely curved kraft paper covered outer mold surfaces which are smooth, and which mold structure has increased strength at the curved mold surfaces where needed without requiring bending of flat corrugated paperboard material in the mold construction; to provide a completely new corrugated paperboard mold structure for molding hollow rubber products such as fuel tanks and the like; to provide a new mold structure which presents extremely smooth outer mold surfaces and particularly extremely smooth curved mold surfaces; and to provide a new paperboard mold structure which eleminates numerous difficulties heretofore encountered in the art, achieves the stated objects simply, effectively and inexpensively, and solves problems and satisfies existing needs in the art.

These and other objects and advantages apparent from the following description may be obtained, the stated results achieved, and the described difficulties overcome by the structures, devices, elements, arrangements, parts, combinations and subcombinations, which comprise the present invention, the nature of which is set forth in the following general statement, preferred embodiments of which—illustrative of the best mode in which applicant has contemplated applying the principles—are set forth in the following description and shown in the drawings, and which are particularly and distinctly pointed out and set forth in the appended claims.

The nature of the improved corrugated paperboard mold structure may be stated generally as including in a mold having flat and curved walls, such as a cylindrical mold having flat end walls and a cylindrical side wall, spaced flat paperboard end wall members each having a marginal edge formed to desired contour; curved side walls extending between the end wall members; the side walls including narrow elongated slat-like paperboard members extending between said end wall members at spaced intervals in a zone along and around the marginal edges of said end wall members; each slat-like member having ends, inner and outer edges and faces; the slat-like members being positioned with their faces extending perpendicular to the marginal edges of said end walls so that the slat-like member outer edges define a mold side wall contour matching the marginal edge contour of said mold end wall members; means joining the ends of the slat-like members to the mold end wall members; and a kraft paper member extending around and joined to the outer edges of the slat-like members and extending between the mold end wall members to form a smooth contoured mold side wall surface.

By way of example, several embodiments of the improved paperboard mold structure are shown in the accompanying drawings forming part hereof in which.

Similar numerals refer to similar parts throughout the various figures of the drawings.

A typical fuel cell form or mold structure incorporating the concepts of the invention is indicated generally at 1; and such structure when formed of paper or paper products such as box board or corrugated paperboard, herein called "paperboard," provides a form for molding hollow members or containers of the desired size and shape from rubber, synthetic rubber or like materials. After molding, the paperboard form is destroyed or disintegrated by filling the inide of the mold within the hollow molded product with hot water or team to destroy the mold. It is preferred in the manufacture of such molded fuel cells to make the mold entirely of paper products for ease of destruction and removal from the molded article.

Figure 1:
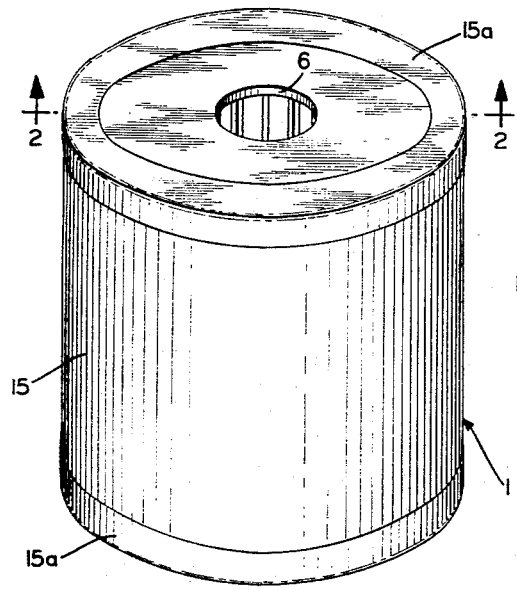
FIGURE 1 is a perspective view of a cylindrical mold for a rubber tank or container incorporating the improved construction.

The cylindrical mold 1 in FIG. 1 is a simple example of a fuel cell mold which may have any size such as two feet in diameter by two feet long. The mold size may have a wide range, such as a cylindrical mold as large as seven feet in diameter and ten feet long, as well as molds say forty-five inches in diameter and sixty-eight inches long.

In accordance with the invention, mold 1 is formed using spaced flat paperboard end walls members 2 and 3. Members 2 and 3 are shown as single sheets of corrugated paperboard, but these members may include laminations of multiple paperboard sheets forming a multiple thickness panel to provide the requisite strength. Furthermore, various weights and strengths of corrugated paperboard may be used. The end wall members 2 and 3 as shown are formed with a series of radially extending slots 4 in the zone along and around the marginal edges 5 of end wall member 2 or 3. One or both of members 2 or 3 also may have a central opening 6 of desired size for access to the interior of the finished mold when required.

Figure 2:
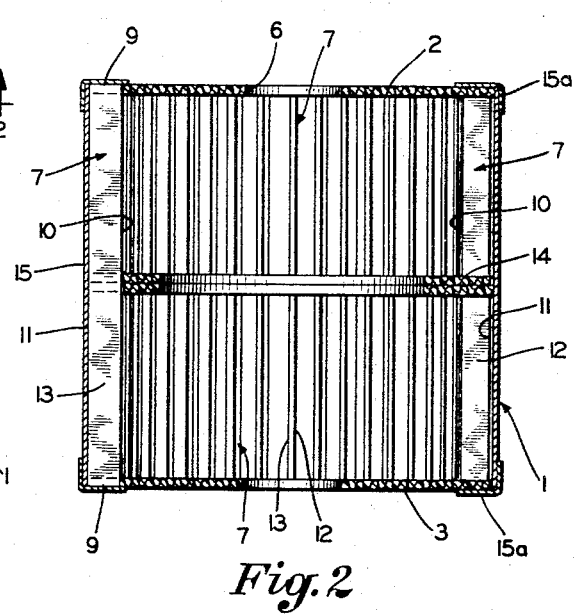
FIG. 2 is an axial section taken on the line 2—2, FIG. 1.
Figures 4, 5:
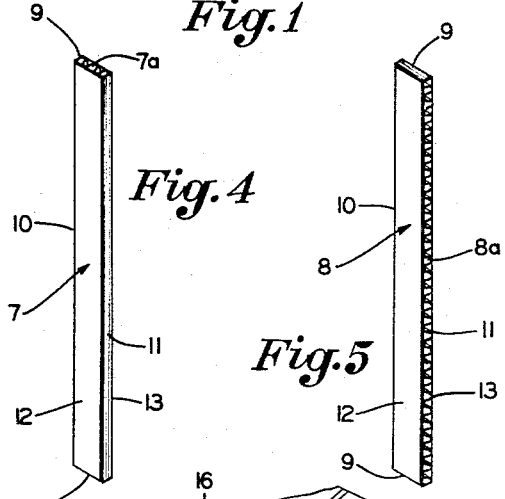
FIG. 4 is a perspective view of one form of slat which may be used in constructing the mold of FIG. 1.
FIG. 5 is a view similar to FIG. 4 of another form of slat which may be used.
Figure 3:
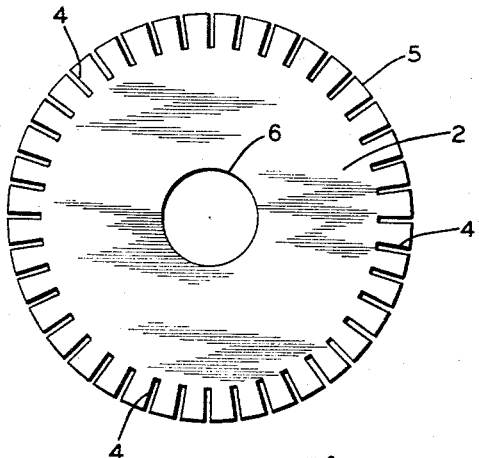
FIG. 3 is a plan view of one form of mold end member for the mold shown in FIG. 1.

A series of elongated slat-like paperboard members 7 or 8 (FIGS. 4 and 5) is assembled with members 2 and 3 as shown in FIG. 2. The slat-like member 7 has corrugations 7a running lengthwise of the member, while member 8 has corrugations 8a running laterally of the member, as shown.

The slat-like members 7 or 8 extend between end wall members 2 and 3 at spaced intervals along and around the marginal edges 4 and 5 of members 2 and 3. Each slat-like member has ends 9, an inner edge 10, an outer edge 11 and side faces 12 and 13. The slat-like members 7 or 8 when assembled as in FIG. 2 are positioned or located with their faces 12 and 13 extending perpendicular to the marginal edges 5 of the end walls 2 and 3 so that the slat-like member outer edges 11 define a mold side wall contour matching the marginal edge contour of the end wall members 2 and 3 as indicated. The contour of the marginal edges of end members 2 and 3 is circular to form the mold 1 as a cylinder.

Slat-like members 7 or 8 are joined to the end members 2 and 3 preferably by gluing the ends 9 of salt-like members engaged in slots 4 to end members 2 and 3, as shown.

If required for mold strength and rigidity, slat-like members 7 or 8 may be held in position and reinforced by a reinforcing ring 14 shown in FIG. 2 which has the same marginal contour as the marginal contour 5 of members 2 and 3, and is similarly formed with radial slots to receive the slat-like members 7 or 8. Any number of reinforcing partition rings 14 may be used as required, one ring being shown in FIG. 2. Further, ring 14 for strength may comprise a two-ply paperboard ring, as shown.

After the members 2 and 3, slat-like members 7 and 8 and reinforcing ring 14 are assembled and glued together as shown in FIG. 2, kraft paper 15 is wrapped around the assembled structure to complete the formation of the side wall surface extending between end wall members 2 and 3. Any desired weight of kraft paper may be used depending upon the strength required, and the kraft paper 15 may comprise any number of wraps around the mold structure, as desired.

Glue may be applied to the outer edges 11 of the slat-like members to which the kraft paper will adhere. If desired, the mold corners may be completed by applying gummed paper strips 15a along and around the corners where the end and side walls intersect.

The construction described provides a maximum of strength and rigidity for the side walls, due to the ribbed or slat-like character and arrangement of the side wall forming slat-like members. In accordance with the concept of the invention, the kraft paper cover 15 presents a completely smooth outer surface for the curved side wall surface of mold 1. This in turn forms the desired completely smooth inner surface on a rubber product molded upon mold 1.

Figure 6:
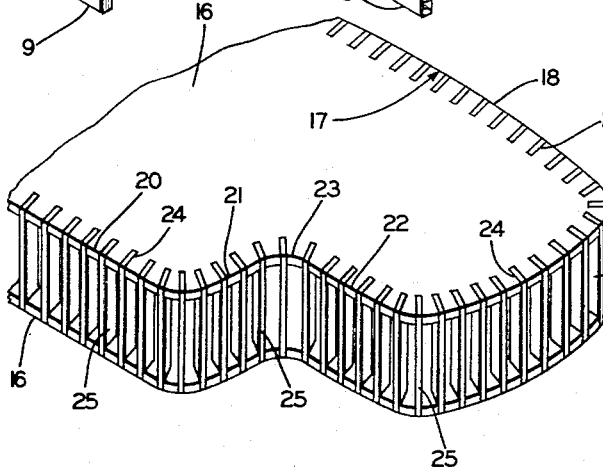
FIG. 6 is a fragmentary perspective view illustrating the improved mold structure used in the construction of a mold having variously curved and angled concave and convex mold side wall surfaces.
Figure 7:
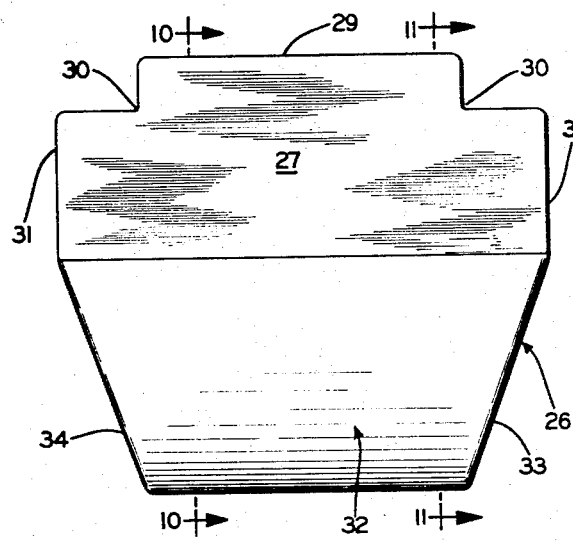
FIG. 7 is a top plan view of another mold shape.

The concepts of the present invention may be applied to and utilized in the construction of any desired shape of mold having all kinds of curved surfaces as well as flat surfaces as shown, for example, in FIG. 6. End wall members 16 of the mold shown in FIG. 6 are cut to present the desired outer edge marginal contour generally indicated at 17 which may include a slightly curved edge 18. Sharply convex rounded corners 19, a flat side wall contour 20, curved contours 21 and 22 joined by a sharply curved concave contour 23. The marginal edges 17 of end members 16 are formed with slots 24. End members 16 are joined together in spaced relation by the paperboard slat-like members 25 whose outer edges define a side wall contour matching the marginal contour 17 of end members 16. The ends of the slat-like members 25, as shown, are received in the slots 24 and are preferably glued or otherwise cemented to end members 16, thus providing a very strong and rigid mold structure formed entirely of flat paperboard members without bending any of the paperboard.

The mold structure shown in FIG. 6 may be completed by applying any desired number of layers of kraft paper to and gluing the same to the slat-like members 25 around the periphery of the assembled structure to provide a smooth outer surface for the contoured side walls of the mold.

FIGURES 7, 8, 9, 10 and 11 show another shape of mold 26 which may be constructed utilizing the concepts of the new invention. Mold 26 may have a flat top wall 27, a flat bottom wall 28 and a flat rear wall 29 which may be notched inwardly with a V-shaped wall formation 30 at each of the rear corners. Flat end walls 31 also are provided.

As shown, flat top wall 27, flat bottom wall 28, flat rear wall 29, flat corner walls 30 and flat end walls 31 each may be formed as flat paperboard panels. These panels may be joined together at the various intersecting corners in the usual manner. Mold 26, however, has a curved front nose wall 32, and the nose portion may have inwardly angled end walls 33 and 34 throughout the extent that curved nose wall 32 projects from top and bottom walls 27 and 28 and side walls 31.

Figure 9:
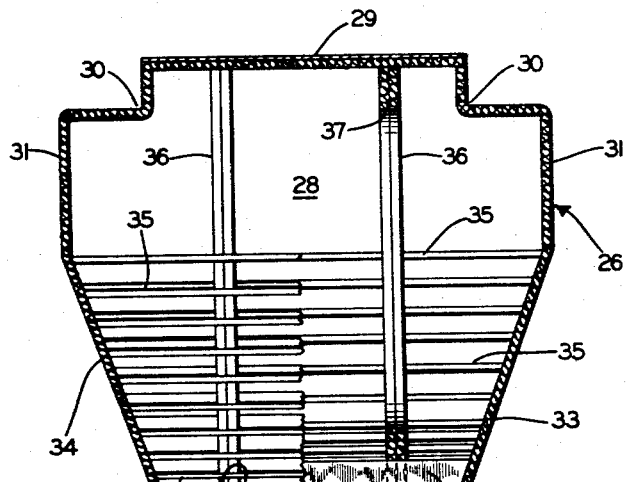
FIG. 9 is a plan sectional view looking in the direction of the arrows 9—9, FIG. 8.

The angled end walls 33 and 34 may be formed from flat paperboard panels, and as shown in FIG. 9, a series of slat-like paperboard members 35 extend laterally between the angled end walls 33 and 34. The ends of members 35 may be glued to the inner faces of members 33 and 34. Any desired number of reinforcing members 36 also may be used, two being shown in FIG. 9. Members 36 extend from rear wall 29 and top and bottom walls 27 and 28 forwardly with a front edge portion 36a defining the contour of nose wall 32. These reinforcing members 36, as shown, are two-ply paperboard members which may be centrally cut out at 37. The slat-like members 35 may either extend full width of the mold and pass through slots cut in the edges of members 36, as shown, or a series of shorter slat-like members may extend between end wall 33 and one reinforcing member 36, another series between the two reinforcing members 36, and a third series between the other reinforcing members 36 and the other end wall 34. The ends of the slat-like members of each series will be glued to the members 33, 34 and 36 and without notching the members 36.

Figure 10:
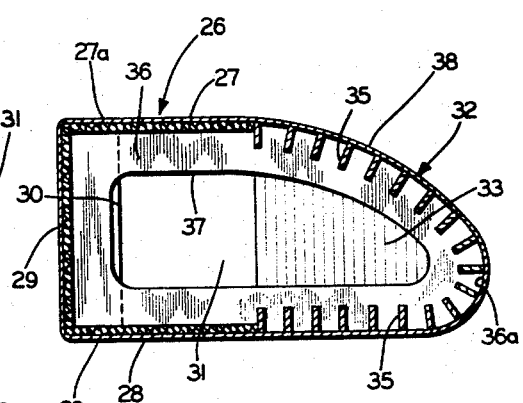
FIG. 10 is a sectional view taken on the line 10—10, FIG. 7.
Figure 8:
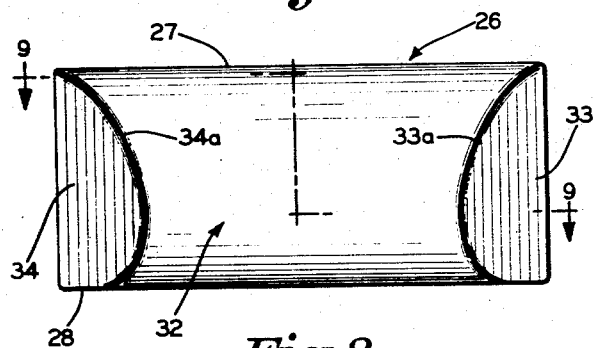
FIG. 8 is an end view of the mold shown in FIG. 7.

Again, as shown in FIG. 10, the faces of slat-like members 35 of mold 26 extend perpendicular to the marginal edges of nose wall defining end walls 33 and 34 and to the edge portion 36a of member 36. Thus, the outer edges of slat-like members 35 define a mold wall contour matching the contour of the rounded ends 33a and 34a of the angled end walls 33 and 34.

Kraft paper is applied and glued or cemented to the outer edges of the slat-like members 35 as indicated at 38 and this kraft paper cover may extend if desired over and along the outer surfaces of the top and bottom members 27 and 28 as indicated at 27a and 28a.

Figure 11:
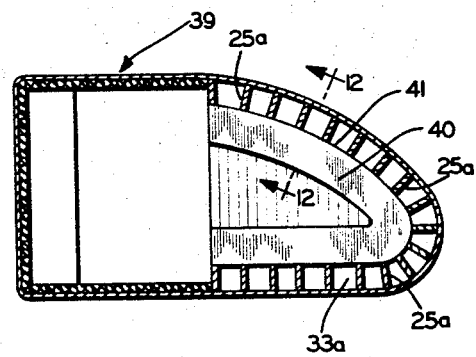
FIG. 11 is a sectional view taken as on the line 11—11, FIG. 7 illustrating a modified form of construction.
Figure 12:
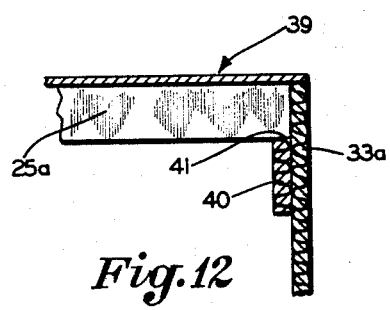
FIG. 12 is a section taken on the 12—12, FIG. 11.

A modified manner in which the slat-like members 25a may be supported on or joined at their ends to flat end wall members of a mold 39 is shown in FIGS. 11 and 12. The paperboard ledge cleat 40 having a contour 41 matching the contour of the outer marginal edge of the nose end wall 33a may be cemented to the inner surface of end wall 33a with its matching outer marginal contour 41 spaced from the outer contour of wall 33a. In this manner, the ends of the slat-like members 25a may rest on the outer edge 41 of the ledge cleat 40.

Accordingly, the present invention provides an improved corrugated paperboard and kraft paper destructible mold structure having mold surfaces which are completely smooth, though curved to any degree either convexly or concavely, and having mold walls provided with increased strength where needed without requiring bending of flat paperboard material; and provides a new mold structure which eliminates difficulties, achieves the objectives and solves problems existing in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details, sizes, etc. shown or described.

Having now described the features, discoveries and principles of the invention, the manner in which the improved paperboard mold structure may be made, the characteristics of the new construction, and the advantageous, new and useful results obtained; the new and useful structures, devices, elements, arrangements, parts, combinations and mechanical equivalents obvious to those skilled in the art are set forth in the appended claims.

I claim:

1. In a paperboard mold for use in the manufacture of hollow articles, spaced paperboard end walls each having a marginal edge at least a portion of which has a curved contour; paperboard slats extending between the end walls at spaced intervals around said curved marginal edge portions; the slats having ends joined to said end walls and having outer edges extending between the end wall curved portion marginal edges to define the contour of a curved mold side wall portion; a kraft paper member extending between the end walls and around the slats and the end wall curved portion marginal edges; and the kraft paper member being joined to the slats to form a curved mold side wall portion with a smooth outer surface.

2. The construction defined in claim 1 in which the paperboard end walls and slats are flat paperboard members.

3. The construction defined in claim 1 in which the marginal adges of the paperboard end walls each are curved throughout their extent.

4. The construction defined in claim 1 in which the end wall marginal edges are circular to form a cylindrical mold.

5. The construction defined in claim 1 in which the spaced paperboard end walls are flat and are parallel with each other.

6. The construction defined in claim 1 in which the slats extend perpendicularly to the curved portion marginal edges of the end walls.

7. The construction defined in claim 1 in which the end wall curved marginal edge portions are formed with slots, and in which the slat ends extend into said slots for joining the slat ends to the end walls.

8. The construction defined in claim 1 in which a paperboard reinforcing member is provided intermediate the end walls having a marginal portion joined with the slats.

9. In a paperboard mold for use in the manufacture of hollow articles, spaced paperboard end walls each having a marginal edge at least a portion of which has a curved contour; a curved mold side wall portion extending between the end wall curved contour portions; said side wall including narrow elongated paperboard slats extending between said end walls at spaced intervals in a zone along and around the end wall curved contour marginal edge portions; each slat having ends, inner and outer edges and faces; the slats being positioned with their faces extending perpendicularly to the curved contour marginal edge portions so that the slat outer edges define a mold side wall portion contour matching said marginal edge portion contour; means joining the slat ends to the end walls; and a kraft paper member extending around and joined to the other edges of the slats and extending between the end walls to form a smooth curved mold side wall surface.

10. The construction defined in claim 9 in which the paperboard end walls and slats are flat paperboard members and in which the end walls are parallel with each other.

11. The construction defined in claim 10 in which the marginal edges of the paperboard end walls each are curved throughout their extent, in which the end wall curved marginal edge portions are formed with slots, and in which the slat ends extend into said slots for joining the slat ends to the end walls.

12. The construction defined in claim 9 in which a paperboard reinforcing member is provided intermediate the end walls having a marginal edge portion joined with the slats.

References Cited

UNITED STATES PATENTS

| | | | |
|---|---|---|---|
| 1,392,496 | 10/1921 | Hain. | |
| 1,892,311 | 12/1932 | MacDonald | 249—175 |
| 2,374,386 | 4/1945 | Shakesby | 249—183 |
| 2,460,845 | 2/1949 | Rempel. | |
| 2,823,442 | 2/1958 | Miller et al. | 25—128.1 X |
| 2,870,515 | 1/1959 | Parfitt | 25—128.1 X |
| 3,024,513 | 3/1962 | Shuxteau et al. | 249—134 |
| 3,148,444 | 9/1964 | Stark | 249—176 X |

OTHER REFERENCES

Engineering News-Record article, "Jay-Tubes For Hollow Slab Bridges", p. 40, Nov. 5, 1959.

J. HOWARD FLINT, JR., *Primary Examiner.*

U.S. Cl. X.R.

25—128; 249—61, 134, 183